(12) United States Patent
Kim et al.

(10) Patent No.: US 12,313,436 B2
(45) Date of Patent: May 27, 2025

(54) AUTOMATIC DISPENSER FOR MIXED MEASUREMENT OF GRAIN

(71) Applicant: Cuckoo Electronics Co., Ltd., Yangsan-si (KR)

(72) Inventors: Suk Kim, Yangsan-si (KR); Won Joo Kim, Yangsan-si (KR); You Jin Shin, Yangsan-si (KR)

(73) Assignee: Cuckoo Electronics Co., Ltd. (KR)

( * ) Notice: Subject to any disclaimer, the term of this patent is extended or adjusted under 35 U.S.C. 154(b) by 402 days.

(21) Appl. No.: 18/053,863

(22) Filed: Nov. 9, 2022

(65) Prior Publication Data
US 2023/0152137 A1    May 18, 2023

(30) Foreign Application Priority Data
Nov. 17, 2021 (KR) .......................... 10-2021-0158868

(51) Int. Cl.
*G01F 11/24* (2006.01)
*A47J 47/01* (2006.01)
(Continued)

(52) U.S. Cl.
CPC ............... *G01F 11/24* (2013.01); *A47J 47/01* (2013.01); *A47J 47/06* (2013.01); *B65D 83/775* (2025.01);
(Continued)

(58) Field of Classification Search
CPC . B05B 11/107; B05B 11/1047; B05B 11/026; B05B 11/1094; B05B 11/0054;
(Continued)

(56) References Cited

U.S. PATENT DOCUMENTS

| | | | | |
|---|---|---|---|---|
| 3,101,872 A | * | 8/1963 | Dickinson | ........... G07F 17/0071 |
| | | | | 222/242 |
| 4,391,140 A | * | 7/1983 | Reinhard | ................ G01F 11/24 |
| | | | | 73/863.52 |

(Continued)

FOREIGN PATENT DOCUMENTS

KR    1020210050381 A    5/2021

*Primary Examiner* — Frederick C Nicolas
(74) *Attorney, Agent, or Firm* — Luedeka Neely, P.C.

(57) ABSTRACT

An automatic dispenser for mixed measurement of grain includes a storage bin having a plurality of holes on a bottom surface and storing grains, a main measurer having a plurality of partitioned measurement compartments and rotatably installed at a position overlapping any one of a plurality of holes provided on the bottom surface of the storage bin, an auxiliary measurer having a plurality of partitioned measurement compartments and installed at a position overlapping the rest of the plurality of holes provided on the bottom surface of the storage bin, the measurement compartment being installed to be rotatable only in one direction with respect to the main measurer, a measurer housing installed below the main measurer and the auxiliary measurer and having a discharge port discharging grains introduced into the main measurer and the auxiliary measurer from the storage bin, and a motor rotating the main measurer in both directions, wherein only the main measurer is used or both the main measurer and the auxiliary measurer are used depending on a rotation direction of the motor.

26 Claims, 17 Drawing Sheets

(51) Int. Cl.
*A47J 47/06* (2006.01)
*B65D 83/00* (2006.01)
*B65G 47/82* (2006.01)
*G01G 19/393* (2006.01)

(52) U.S. Cl.
CPC ........... *B65G 47/82* (2013.01); *G01G 19/393* (2013.01); *A47J 2203/00* (2013.01); *B65G 2203/0283* (2013.01)

(58) Field of Classification Search
CPC ..... B05B 11/0038; G01F 11/24; B65G 47/82; B65G 2203/0283; G01G 19/393; A47J 47/01; A47J 47/06; A47J 2203/00; B65D 83/775
See application file for complete search history.

(56) References Cited

U.S. PATENT DOCUMENTS

| | | | | |
|---|---|---|---|---|
| 4,785,976 A * | 11/1988 | Bennie | .................... | A01C 15/16 239/665 |
| 4,880,150 A * | 11/1989 | Navin | ..................... | G01F 11/24 222/367 |
| 5,778,767 A * | 7/1998 | Rudesill | .............. | A47J 37/1228 221/265 |
| 5,934,516 A * | 8/1999 | Strycharske | ............ | G01F 11/24 222/239 |
| 6,550,640 B2 * | 4/2003 | Smith | ..................... | G01F 11/24 222/430 |
| 8,074,837 B2 * | 12/2011 | Nevarez | ................... | B67D 1/07 222/367 |
| 8,827,185 B2 * | 9/2014 | Simmons | ................ | A47J 47/04 222/472 |
| 9,587,972 B2 * | 3/2017 | Landau | ................... | B01F 27/82 |
| 9,976,891 B1 * | 5/2018 | Fanton | .................... | G01F 11/42 |

* cited by examiner

AUTOMATIC DISPENSER FOR MIXED MEASUREMENT OF GRAIN

TECHNICAL FIELD

The present disclosure relates to an automatic dispenser for mixed measurement of grain.

BACKGROUND ART

In a measurement rice bin of a related art, a measurer is mounted at a lower portion of a rice bin and a user may discharge a desired amount of rice. Most of the rice bins on the market includes only one rice storage bin and one rice measurer, so only one grain, such as rice may be used. Therefore, if a user wanted to mix grains other than rice, the user had to mix the grains and then put them in the rice bin.

Recently, in order to solve this drawback, a rice bin in which three grains are separately stored and a mixing ratio of each grain may be adjusted has been released. A measurer mounted in a rice bin of the related art is a cylindrical rotation type measurer that measures the amount of rice by the volume of rice contained in the measurer in a cylindrical rotary type, and the user directly rotates the measurer to operate it.

A product that automatically dispenses a fixed amount of feed using a motor, having a structure similar to that of a rice bin, has been released as a feed feeder for companion animals or livestock, but even in this case, only one feed storage bin is provided. An example of a prior art dispenser is shown in Korean Patent Laid-Open Publication No. 10-2021-0050381.

SUMMARY

An aspect of the present disclosure is to provide an automatic dispenser that has two or more storage bins and measurers, may automatically measure and discharge grains using one motor, and control a mixing ratio of grains.

In an aspect, there is provided an automatic dispenser for mixed measurement of grain, including a storage bin having a plurality of holes on a bottom surface and storing grains, a main measurer having a plurality of partitioned measurement compartments and rotatably installed at a position overlapping any one of a plurality of holes provided on the bottom surface of the storage bin, an auxiliary measurer having a plurality of partitioned measurement compartments and installed at a position overlapping the rest of the plurality of holes provided on the bottom surface of the storage bin, the measurement compartment being installed to be rotatable only in one direction with respect to the main measurer, a measurer housing installed below the main measurer and the auxiliary measurer and having a discharge port discharging grains introduced into the main measurer and the auxiliary measurer from the storage bin, and a motor rotating the main measurer in both directions, wherein only the main measurer is used or both the main measurer and the auxiliary measurer are used depending on a rotation direction of the motor.

The automatic dispenser for mixed measurement of grains according to the present disclosure has two or more storage bins and measurers and has a structure capable of automatically measuring and dispensing grains using one motor and capable of adjusting a mixing ratio of grain, thereby increasing user convenience.

DETAILED DESCRIPTION

Hereinafter, the present disclosure will be described in more detail with reference to the drawings.

Figure 1:
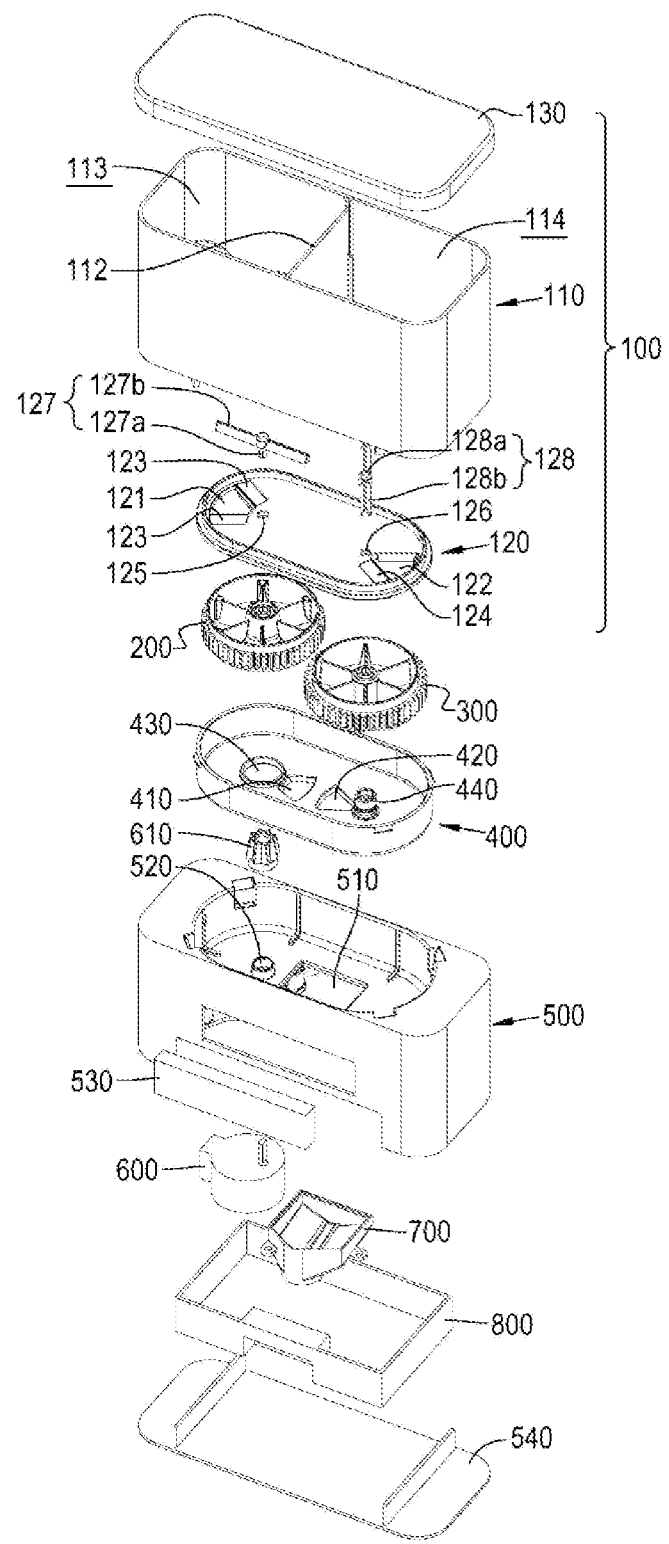
FIG. 1 is an exploded view of an automatic dispenser for mixed measurement of grains according to an embodiment of the present disclosure.

FIG. 1 is an exploded view of an automatic dispenser for mixed measurement of grains according to an embodiment of the present disclosure.

The automatic dispenser for mixed measurement of grains according to an embodiment of the present disclosure includes a storage bin 100 storing grains, etc., and a main measurer 200 and an auxiliary measurer 300 installed at a lower portion of the storage bin 100, measuring a certain amount of grains discharged through holes 121 and 122 provided in a bottom surface 120 of the storage bin 100, and discharging the certain amount of grains. The main measurer 200 and the auxiliary measurer 300 are rotatably installed in a measurer housing 400, and the measurer housing 400 includes discharge ports 410 and 420 discharging grains at positions that do not overlap the holes 121 and 122 of the bottom surface 120.

The measurer housing 400 is coupled to a base 500, and electrical components and a controller 530 controlling the electrical components are installed in the base 500. A motor 600 providing rotational force to the measurers 200 and 300 is installed in the base 500, and a shaft of the motor 600 is coupled to a main gear 610 through a shaft hole 520 of the base 500. A base cover 540 covering the base 500 is coupled to a lower portion of the base 500. In addition, a grain receiver 800 may be detachably coupled to the base 500 so that the user may move discharged grains. The grains discharged through the discharge ports 410 and 420 move to the grain receiver 800 along a discharge tube 700 installed in the base 500. Here, the base 500 includes a communication hole 510 connected to the discharge tube 700 to deliver grains.

Figure 2:
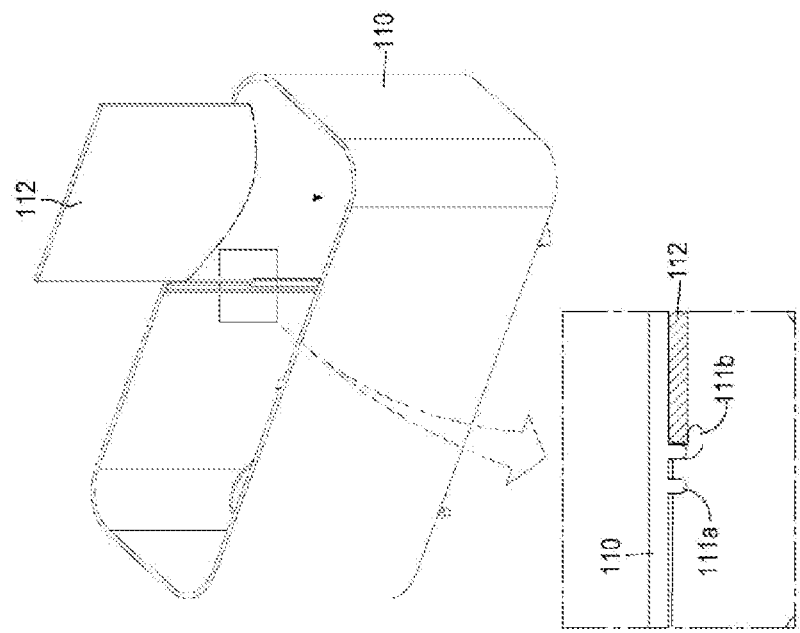
FIG. 2 is a view illustrating a storage bin provided in an automatic dispenser for mixed measurement of grains according to an embodiment of the present disclosure.
Figure 2:
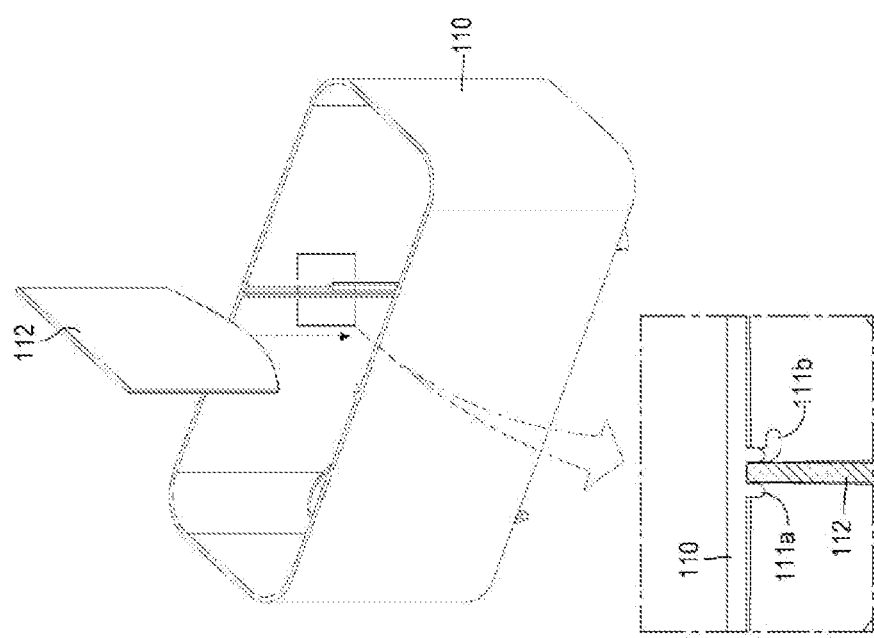

FIG. 2 is a view illustrating the storage bin provided in an automatic dispenser for mixed measurement of grains according to an embodiment of the present disclosure. Referring to FIGS. 1 and 2, the storage bin 100 includes a side wall 110, a bottom surface 120, and a lid 130 to form a closed storage space. An internal space of the storage bin 100 is divided into a main storage compartment 113 and an auxiliary storage compartment 114 by a partition 112. The partition 112 may be detachably coupled to the side wall 110 so that the main storage compartment 113 and the auxiliary storage compartment 114 may be distinguishably used, or may be used as a single space without distinction. In the case of using single grain, the storage bin 100 may be used as one space by removing the partition 112, and in the case of mixedly measuring two or more grains, the storage bin 100 may be divided into two or more spaces by the partition 112. To this end, a pair of fixing ribs 111a and 111b for fixing the partition 112 are formed on the walls facing each other inside the sidewall 110. The partition 112 is fitted between the fixing ribs 111a and 111b to be fixed. Here, in order to accommodate the partition 112 in the side wall 110 when the partition 112 is not used, one of the fixing ribs 111a and 111b has an L-shaped bent shape, and the partition 112 is accommodated between the side wall 110 and the bent fixing rib 111b.

Figure 3:
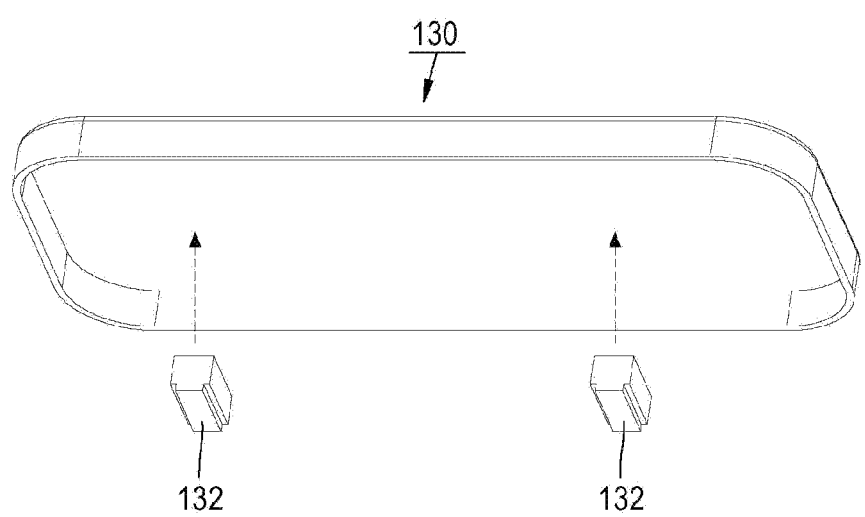
FIG. 3 is a view illustrating a lid of a storage bin provided in an automatic dispenser for mixed measurement of grains according to an embodiment of the present disclosure.

FIG. 3 is a view illustrating the lid of the storage bin provided in the automatic dispenser for mixed measurement of grains according to an embodiment of the present disclosure.

The lid 130 of the storage bin may include one or more sensors 132 on an upper surface thereof to measure a remaining amount of grains stored in the storage bin. In this case, an infrared sensor or the like may be used as the sensor 132, and the remaining amount of grains may be measured by measuring a distance to a top surface of grains. Preferably, the sensor 132 may be provided at a position corresponding to each storage compartment so that the remaining amount of grains may be measured in each partitioned storage compartment. Therefore, in an embodiment of the present disclosure including the main storage compartment 113 and the auxiliary storage compartment 114, two sensors 132 are installed on the lid.

Figure 4:
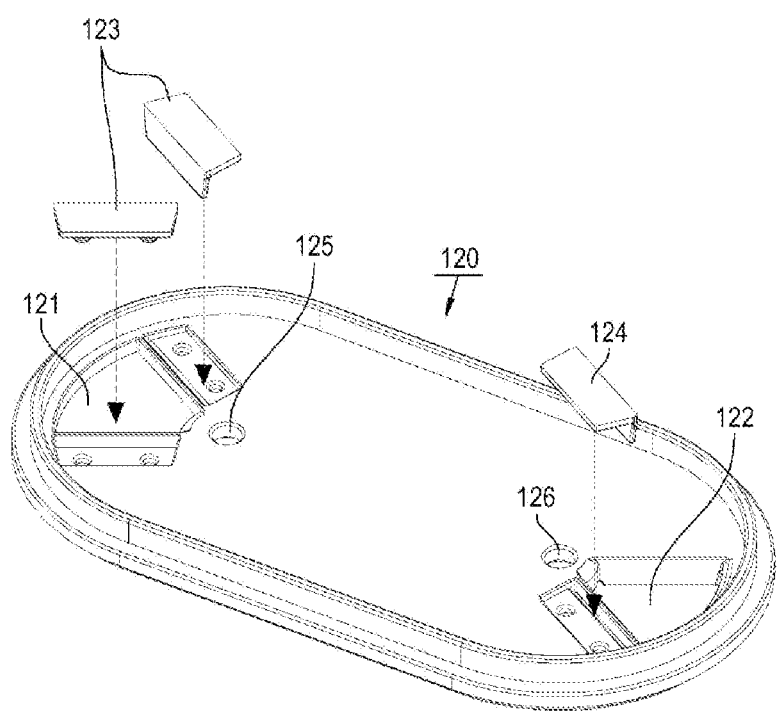
FIG. 4 is a view illustrating a bottom of a storage bin provided in an automatic dispenser for mixed measurement of grains according to an embodiment of the present disclosure.
Figure 5:
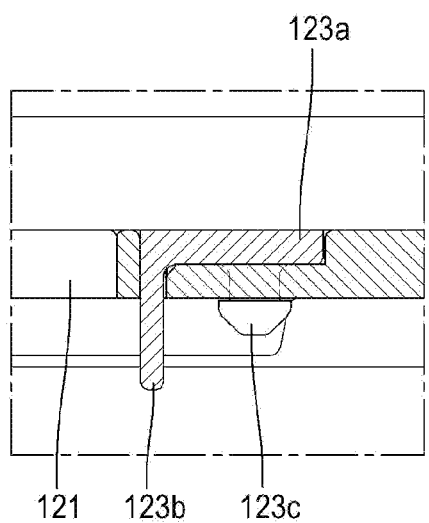
FIG. 5 is a cross-sectional view illustrating installation of a sweeper provided in an automatic dispenser for mixed measurement of grains according to an embodiment of the present disclosure.

FIG. 4 is a view illustrating a bottom of a storage bin provided in an automatic dispenser for mixed measurement of grains according to an embodiment of the present disclosure, and FIG. 5 is a cross-sectional view illustrating installation of a sweeper provided in an automatic dispenser for mixed measurement of grains according to an embodiment of the present disclosure.

Referring to FIGS. 1 and 5, the holes 121 and 122 through which grains are discharged from the storage compartments 113 and 114 are formed in the bottom surface 120 of the storage bin 100. The holes 121 and 122 may be provided at corresponding positions of the storage compartments 113 and 114, respectively, and two holes are provided in an embodiment of the present disclosure. Sweepers 123 and 124 are installed on at least one side of the holes 121 and 122 and protrude downward to sweep the grains discharged to the measurers 200 and 300 into a measurement compartment are installed. Since the sweepers 123 and 124 only located at a front of the measurers 200 and 300 in a rotation direction are substantially used, the sweeper 124 adjacent to the auxiliary storage compartment 114 in which the measurer 300 rotating only in one direction is mounted is installed only in a forward rotation proceeding direction. Since the main measurer 200 installed in the main storage compartment 113 may perform both forward and reverse rotations, the sweeper 123 is attached to both sides of the hole 121.

The sweepers 123 and 124 are bent in an L-shape, an upper surface 123a is attached by a protrusion 123c coupled through the bottom surface 120, and a sweeper surface 123b bent and extended downwardly through the hole 121 sweeps a top surface of grains input to the measurer 200 to be flattened to maintain the amount of grains in the measurer in as a fixed amount and prevents a grain from being caught between the measurer 200 and the bottom surface 120 of the storage bin 100 to hinder rotation of the measurer 200.

The sweepers 123 and 124 may be formed of a soft and elastic material, such as rubber or silicone.

Meanwhile, the bottom surface 120 of the storage bin 100 includes rotor shaft holes 125 and 126 so that blade-type rotors 127 and 128 may be connected to the central axes of the respective measurers 200 and 300. The blade-type rotors 127 and 128 may stir the grains in the storage bin 100, while rotating together with the measurers 200 and 300, so that the grains may be easily discharged through the holes 121 and 122. In addition, the blade-type rotors 127 and 128 may stir the grains stored in the storage bin 100 to be flattened in the top surface, thereby increasing increases accuracy when detecting the remaining amount of the grains. Here, the blade-type rotors 127 and 128 include rotor shafts 127a and 128a coupled to the rotor shaft holes 125 and 126 and blades 127b and 128b extending to both sides of the rotor shafts 127a and 128a. Here, cross-sections of the blades 127b and 128b becomes narrower toward a top so that the grains may easily pass over during rotation. In other words, the cross-sections of the blades 127b and 128b may have a triangular shape, and the lower surfaces of the blades 127b and 128b are in contact with the bottom surface 120 of the storage bin 100.

Figure 6:
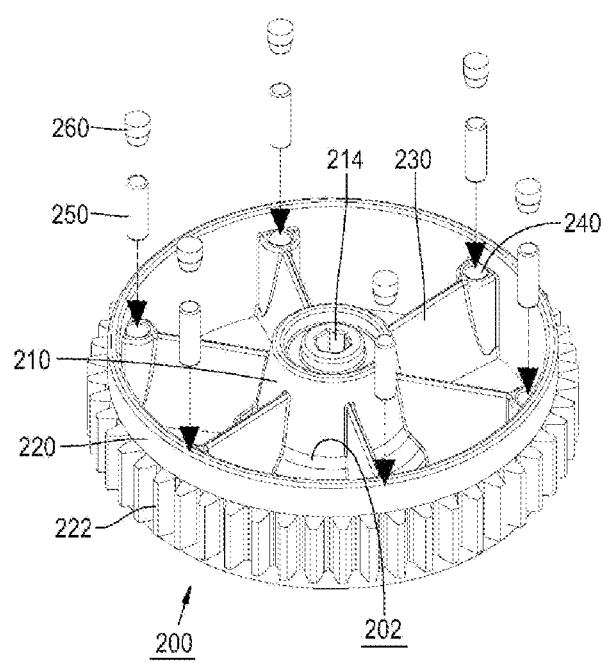
FIG. 6 is a view illustrating a main measurer provided in an automatic dispenser for mixed measurement of grains according to an embodiment of the present disclosure.

FIG. 6 is a view illustrating a main measurer provided in an automatic dispenser for mixed measurement of grains according to an embodiment of the present disclosure.

Referring to FIGS. 1 and 6, the main measurer 200 is installed in the measurer housing 400. A lower groove (not shown) coupled to the main gear 610 of the motor 600 is formed at a lower portion of the central shaft 210 of the main measurer 200, and an upper groove 214 to which the rotor shaft 127a of the blade-type rotor 127 is coupled is formed at an upper portion of the central shaft 210. The main gear 610 and the lower groove are coupled to transmit a rotational force of the motor 600 to the main measurer 200, the blade-type rotor 127, while the rotor shaft 127a engaged with the upper groove 214 rotates, rotates to stir grains.

The main measurer 200 includes an outer ring 220 having a cylindrical shape concentric with the central shaft 210 and having gear teeth 222 formed on an outer circumferential surface thereof and a plurality of partitions 230 radially connecting the outer ring 220 to the central shaft 210, like a spoke, and partitioning a space between the outer ring 220 and the central shaft 210 into the plurality of measurement compartments 202. The main measurer 200 has to be installed at a position where the measurement compartment 202 overlaps the hole 121 below the main storage compartment 113 and the main discharge port 410 of the measurer housing 400.

In addition, one or more magnets 250 may be provided to detect a rotation amount and whether the main measurer 200 is rotated. The magnet 250 is disposed on an inner circumferential surface of the outer ring 220, and the number of installations of the magnet 250 may vary as needed. The main measurer 200 has a magnet accommodating portion 240 into which the magnet 250 may be inserted, and after the magnet 250 is inserted into the magnet accommodating portion 240, the magnet accommodating portion 240 may be stopped with a rubber stopper 260 having elasticity to be fixed.

Figure 7:
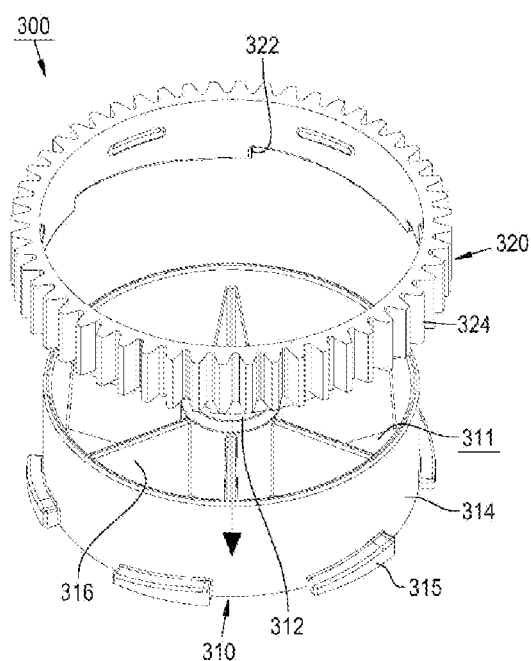
FIG. 7 is a view illustrating an auxiliary measurer provided in an automatic dispenser for mixed measurement of grains according to an embodiment of the present disclosure.

FIG. 7 is a view illustrating an auxiliary measurer provided in an automatic dispenser for mixed measurement of grains according to an embodiment of the present disclosure.

The auxiliary measurer 300 has a form in which an outer part 320 is coupled to an outer circumferential surface of an inner part 310, a ratchet protrusion 315 is formed at a lower end of the outer circumferential surface of the inner part 310, and a ratchet gear 322 is formed at a lower end of the outer part 320 so that only one-way rotation is allowed for the outer part 320 with respect to the inner part 310.

The inner part 310 includes a central shaft 312 as a center of rotation, a cylindrical outer ring 314 concentric with the central shaft 312 and having the ratchet protrusion 315 formed at the lower end of the outer circumferential surface, and a plurality of partitions 316 radially connecting the outer ring 324 to the central shaft 312, like a spoke, and dividing a portion between the outer ring 314 and the central shaft 314 into a plurality of measurement compartments 311.

The outer part 320 has a cylindrical shape coupled to the outer circumferential surface of the inner part 310, having a ratchet gear 322 formed at a lower end, and having a tooth 324 engaged with the gear tooth 222 of the main measurer 200. Accordingly, when the outer part 320 rotates clockwise, the ratchet protrusion 315 and the ratchet gear 322 are engaged with each other, and the inner part 310 rotates together with the outer part 320. Meanwhile, when the outer part 320 rotates counterclockwise, the ratchet gear 322 of the outer part 320 moves on the ratchet protrusion 315 of the inner part 310 to allow relative rotation, so that the outer part 320 rotates to be idle with respect to the inner part 310.

The auxiliary measurer 300 has to be installed at a position where the weighing compartment 311 overlaps the hole 122 below the auxiliary storage compartment 114 and the auxiliary discharge port 420 of the measurer housing 400.

Figure 8:
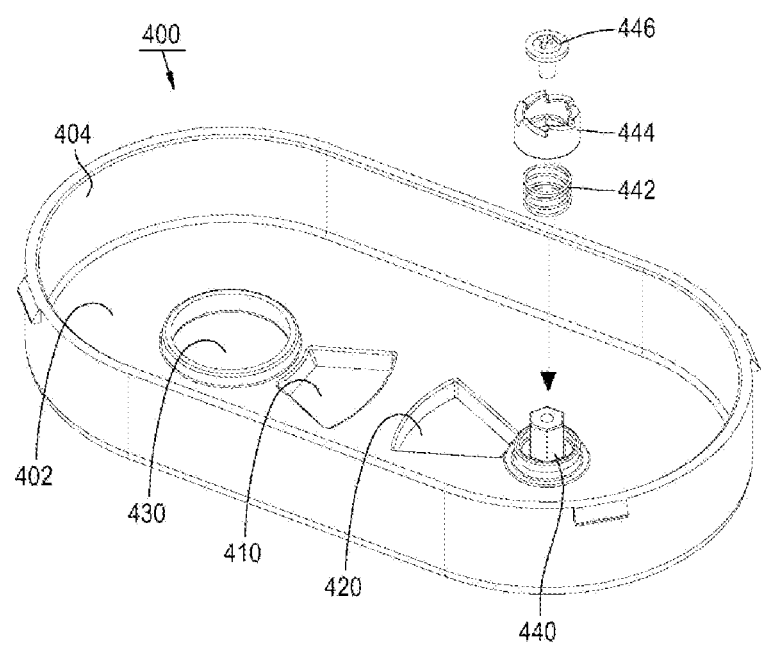
FIG. 8 is a view illustrating a measurer housing provided in an automatic dispenser for mixed measurement of grains according to an embodiment of the present disclosure.

FIG. 8 is a view illustrating a measurer housing provided in an automatic dispenser for mixed measurement of grains according to an embodiment of the present disclosure.

Referring to FIGS. 1 and 8, the measurer housing 400 includes a bottom surface 402 and a side wall 404, and as described above, the bottom surface 402 may include the main discharge port 410 downwardly discharging grains introduced into the main measurer 200 and the auxiliary discharge port 420 downwardly discharging grains introduced into the auxiliary measurer 300.

Also, the measurer housing 400 may have a gear hole 430 at an installation position of the main measurer 200 so that the main gear 610 connected to the motor 600 may pass therethrough to be connected to the main measurer 200. A coupling shaft 440 for coupling a reverse rotation preventing portion (to be described below) is formed at an installation position of the auxiliary measurer 300. The coupling shaft 440 protrudes toward the auxiliary measurer 300. The coupling shaft 440 is preferably in the form of a hexagonal pillar to prevent rotation.

Figure 9:
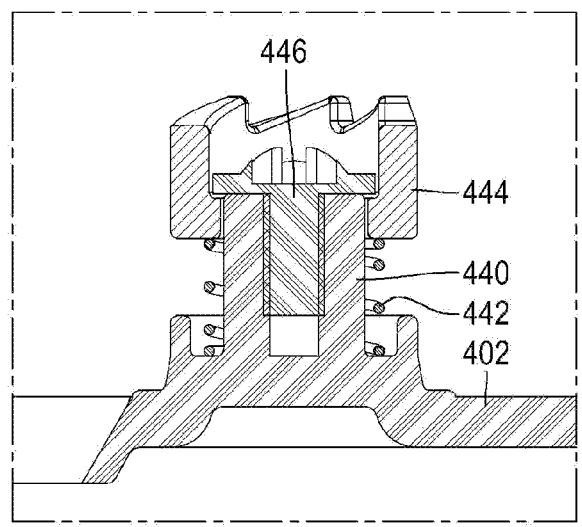
FIG. 9 is a cross-sectional view illustrating an auxiliary measurer reverse rotation preventing portion of a measurer housing provided in an automatic dispenser for mixed measurement of grains according to an embodiment of the present disclosure.

FIG. 9 is a cross-sectional view illustrating an auxiliary measurer reverse rotation preventing portion of a measurer housing provided in an automatic dispenser for mixed measurement of grains according to an embodiment of the present disclosure.

Referring to FIGS. 8 and 9, the reverse rotation preventing portion includes an elastic member 442 fitted to the coupling shaft 440 and having a lower end supported by the measurer housing 400, a ratchet portion 444 supported to be movable up and down by an upper end of the elastic member 442 and having a coupling hole coupled to the coupling shaft 440, and a stopper 446 limiting an upper position of the ratchet portion 444 to prevent the ratchet portion 444 from being released upwardly, and fixed to the coupling shaft 440. Here, the coupling shaft 440 has an angular shape like a hexagonal pillar as described above so that the ratchet portion 444 may not rotate with respect to the coupling shaft 440, and the coupling hole has a shape corresponding to the coupling shaft 440. In an embodiment of the present disclosure, the coupling shaft 440 and coupling hole may have a hexagonal pillar and hexagonal hole shape, a quadrangular pillar or quadrangular hole shape, or a cylindrical shape in which a key hole is formed, as long as the coupling shaft 440 and the coupling hole have a shape that may prevent rotation.

The ratchet portion 444 does not rotate on the coupling shaft 440 and only moves up and down, and receives a force to move upward by the elastic member 442, but the highest point is limited by the stopper 446.

Figure 10:
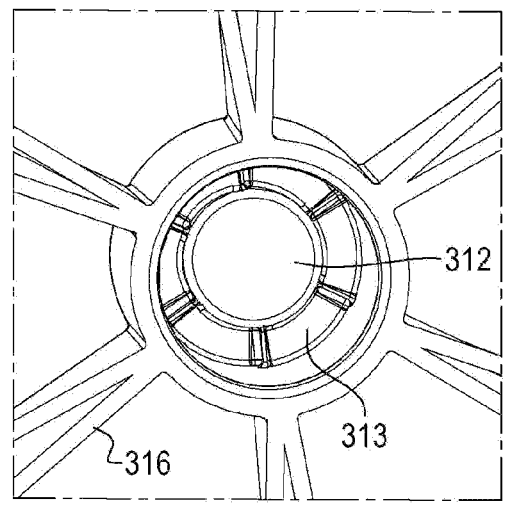
FIG. 10 is a view illustrating a lower surface of a rotating shaft of an auxiliary measurer provided in the automatic dispenser for mixed measurement of grains according to an embodiment of the present disclosure.
Figure 11:
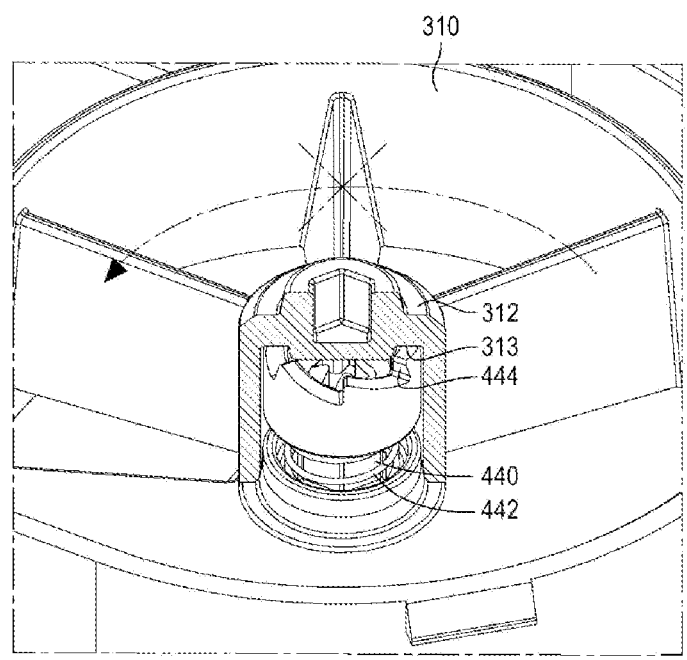
FIG. 11 is a view illustrating a state in which a reverse rotation preventing portion of a measurer housing provided in the automatic dispenser for mixed measurement of grains according to an embodiment of the present disclosure prevents reverse rotation of an inner part of an auxiliary measurer.
Figure 12:
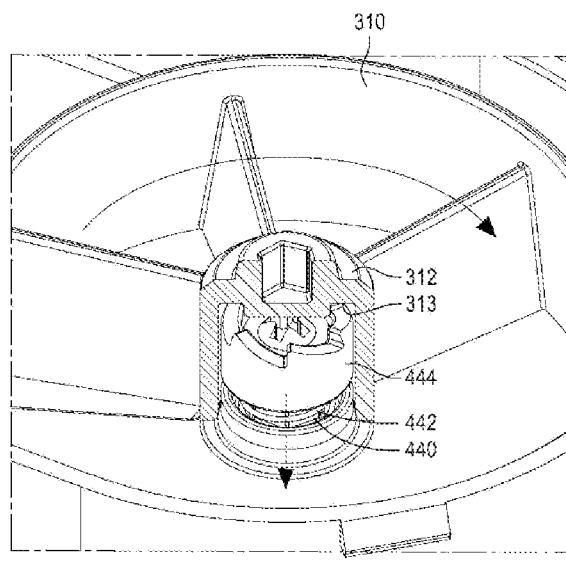
FIG. 12 is a view illustrating a state in which a reverse rotation preventing portion of a measurer housing provided in the automatic dispenser for mixed measurement of grains according to an embodiment of the present disclosure permits forward rotation of an inner part of an auxiliary measurer.

FIG. 10 is a view illustrating a lower surface of a rotating shaft of an auxiliary measurer provided in the automatic dispenser for mixed measurement of grains according to an embodiment of the present disclosure, FIG. 11 is a view illustrating a state in which a reverse rotation preventing unit of a measurer housing provided in the automatic dispenser for mixed measurement of grains according to an embodiment of the present disclosure prevents reverse rotation of an inner part of an auxiliary measurer, and FIG. 12 is a view illustrating a state in which a reverse rotation preventing unit of a measurer housing provided in the automatic dispenser for mixed measurement of grains according to an embodiment of the present disclosure permits forward rotation of an inner part of an auxiliary measurer.

A ratchet gear 313 is formed on a lower surface of the central shaft 312 of the inner part 310 of the auxiliary measurer, and a ratchet portion 444 of the reverse rotation preventing portion is pressed by the elastic member 442 to abut on the ratchet gear 313. Accordingly, counterclockwise rotation of the inner part 310 is limited. Meanwhile, during clockwise rotation, rotation is allowed along an inclined surface of the ratchet portion 444 supported by the elastic member 442 and along an inclined surface of the rachet gear 313 of the central shaft 314 by the elastic member 442, so that the rachet portion 444 is supported by the elastic member 442 to repeatedly move up and down.

When the outer part 320 rotates counterclockwise, relative rotation is allowed and the outer part 320 rotates idle with respect to the inner part 310, but due to a frictional force of the inner part 310 and the outer part 320, the inner part 310 may rotate along the outer part 320, but counterclockwise rotation, i.e., reverse rotation, of the inner part 310 may be prevented due to the reverse rotation preventing portion.

Figure 13:
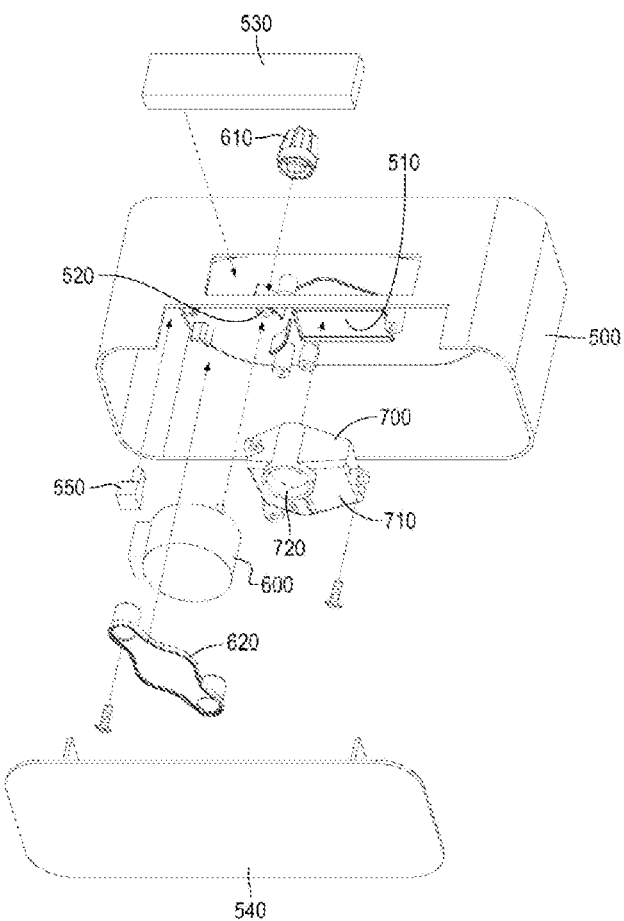
FIG. 13 is a view illustrating a base and parts installed in the base of an automatic dispenser for mixed measurement of grains according to an embodiment of the present disclosure.

FIG. 13 is a view illustrating a base and parts installed in the base of an automatic dispenser for mixed measurement of grains according to an embodiment of the present disclosure.

As described above, the base 50 includes electrical components, such as the motor 600 and the magnet sensor 550, and a controller 530 controlling the electrical components. Here, the shaft of the motor 600 passes through the shaft hole 520 of the base 500 and is coupled with the main gear 610 to provide rotational force to the measurers 200 and 300 and is fixed by a motor holder 620 installed on the base cover 540 covering a lower portion of the base 500. In addition, in the base 500, a grain receiver 800 may be detachably coupled to a lower portion of the discharge tube 700 to allow the user to move the discharged grains. The grains discharged through the discharge ports 410 and 420 move to the grain receiver 800 along the discharge tube 700 installed in the base 500. Here, the base 500 includes the communication hole 510 connected to the discharge tube 700 to deliver grains. The discharge tube 700 is in the form of a hopper having an inclined surface 710 inclined to be low in the middle so as to easily discharge grains, and has a discharge port provided in the center. In addition, when the discharge tube 700 is coupled with a cooking device, such as an automatic rice cooker, when grains are automatically measured and discharged to the discharge port 720, discharged grains may be transferred through a transfer unit, such as suction pressure or a screw method to be introduced into an inner pot in the cooking device.

In addition, the measurer housing 400 is coupled to an upper portion of the base 500.

Figure 14:
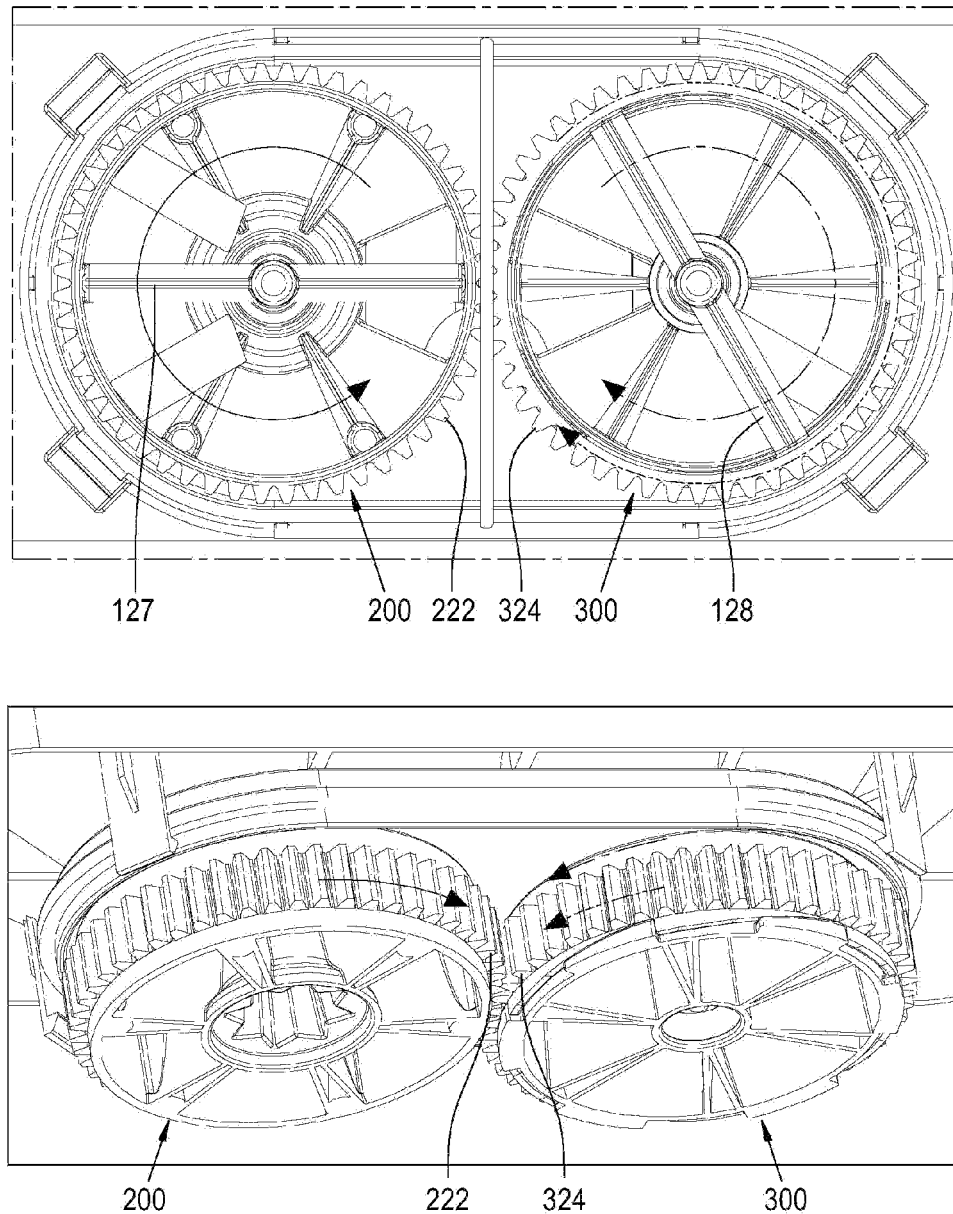
FIG. 14 is a view illustrating rotation of a measurer when a motor of an automatic dispenser for mixed measurement of grains according to an embodiment of the present disclosure rotates forwardly.

FIG. 14 is a view illustrating rotation of a measurer when a motor of an automatic dispenser for mixed measurement of grains according to an embodiment of the present disclosure rotates forwardly.

Hereinafter, forward rotation of the motor refers to a counterclockwise direction, and reverse rotation of the motor refers to a clockwise direction. Therefore, for the main measurer 200 rotating in the same direction as the motor, the counterclockwise direction, and in the case of the auxiliary measurer 300 engaged with the main measurer 200 and rotating in a direction opposite to the main measurer 200, the clockwise direction is a reference direction of the forward direction.

When the motor rotates in the forward direction, the teeth 222 of the main measurer 200 and the teeth 324 of the auxiliary measurer 300 are engaged with each other to rotate. In the case of the auxiliary measurer 300, as described above, since the outer part 320 cannot rotate in the clockwise direction with respect to the inner part 310, the outer part 320 and the inner part 310 have to rotate together, and since the reverse rotation preventing portion allows the inner part 310 to rotate in a clockwise direction, the auxiliary measurer 300 may rotate when the motor rotates forwardly. Accordingly, grains are discharged through the main port 410 and the auxiliary port 420 of the housing 400.

Figure 15:
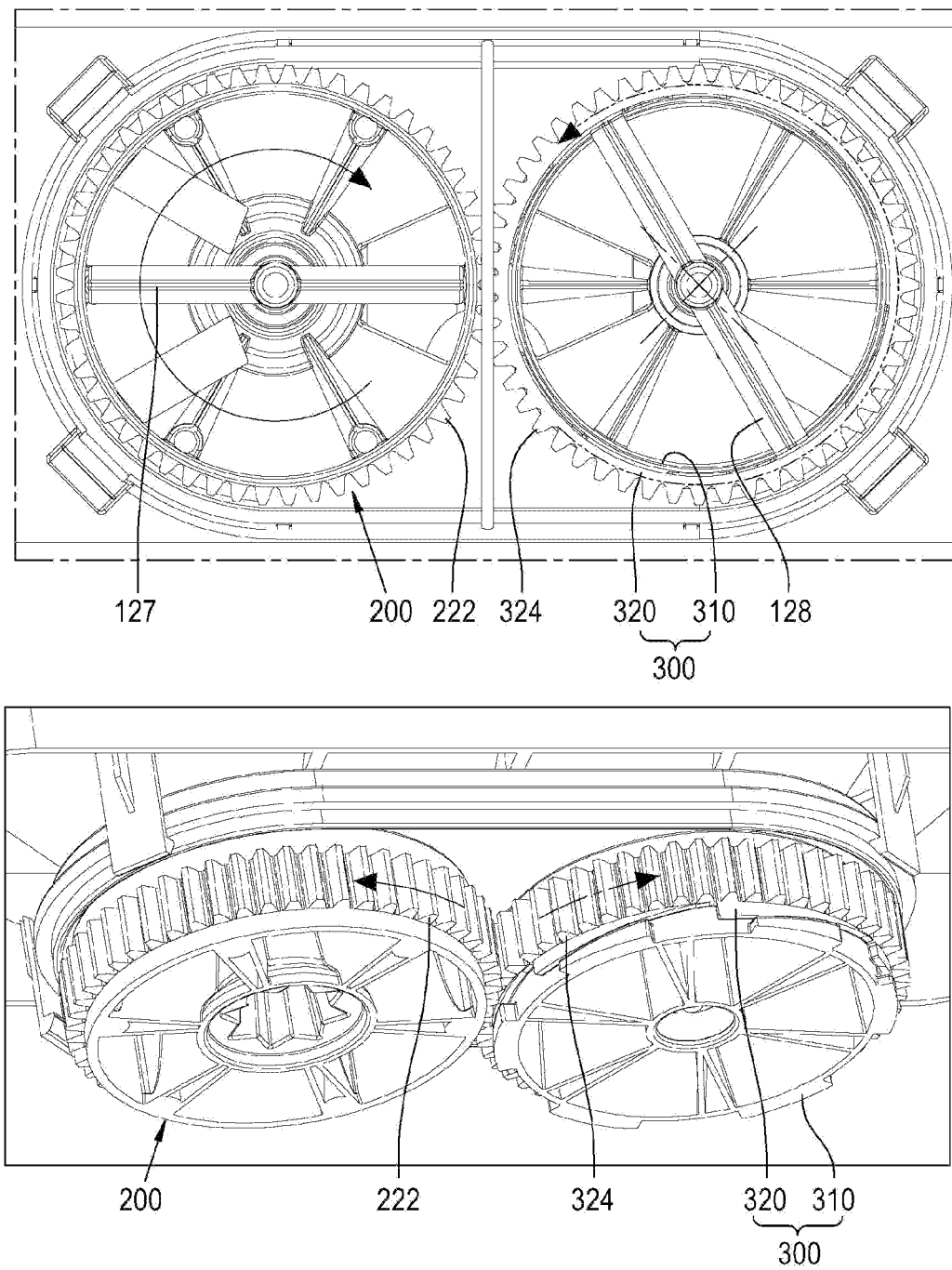
FIG. 15 is a view illustrating rotation of a measurer when a motor of an automatic dispenser for mixed measurement of grains according to an embodiment of the present disclosure rotates reversely.

FIG. 15 is a view illustrating the rotation of the measurer when the motor of the automatic dispenser for mixed measurement of grains according to an embodiment of the present disclosure is reversely rotated.

When the motor rotates in a reverse direction, the teeth 222 of the main measurer 200 and the teeth 324 of the auxiliary measurer 300 are engaged with each other and the outer part 320 of the auxiliary measurer 300 rotates counterclockwise. Since the outer part 320 is allowed to rotate in a counterclockwise direction with respect to the inner part 310 and the reverse rotation preventing portion limits the counterclockwise rotation of the inner part 310, when the motor rotates reversely, the inner part 310 of the auxiliary measurer 300 is stopped and only the outer part 320 rotates. Accordingly, the measurement compartment 311 formed in the inner part 310 and the blade-type rotor 128 connected to the central shaft 312 of the inner part 310 also do not rotate.

Therefore, grains are not discharged through the auxiliary discharge port 420 of the measurer housing 400.

Figure 16:
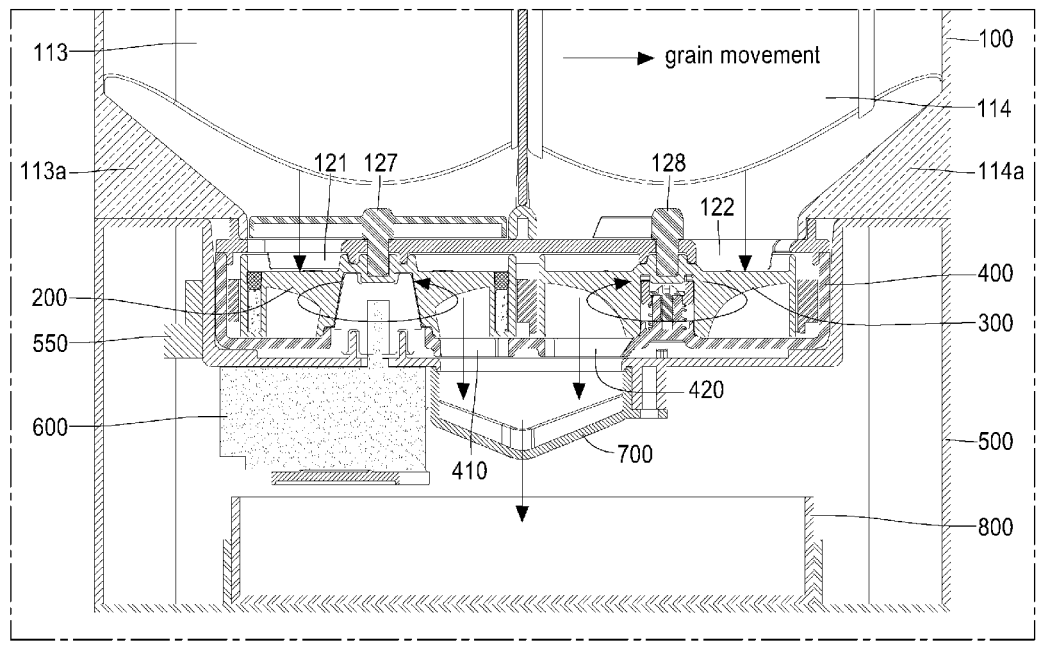
FIG. 16 is a cross-sectional view illustrating a discharge path of grains when a motor of an automatic dispenser for mixed measurement of grains according to an embodiment of the present disclosure rotates forwardly.
Figure 17:
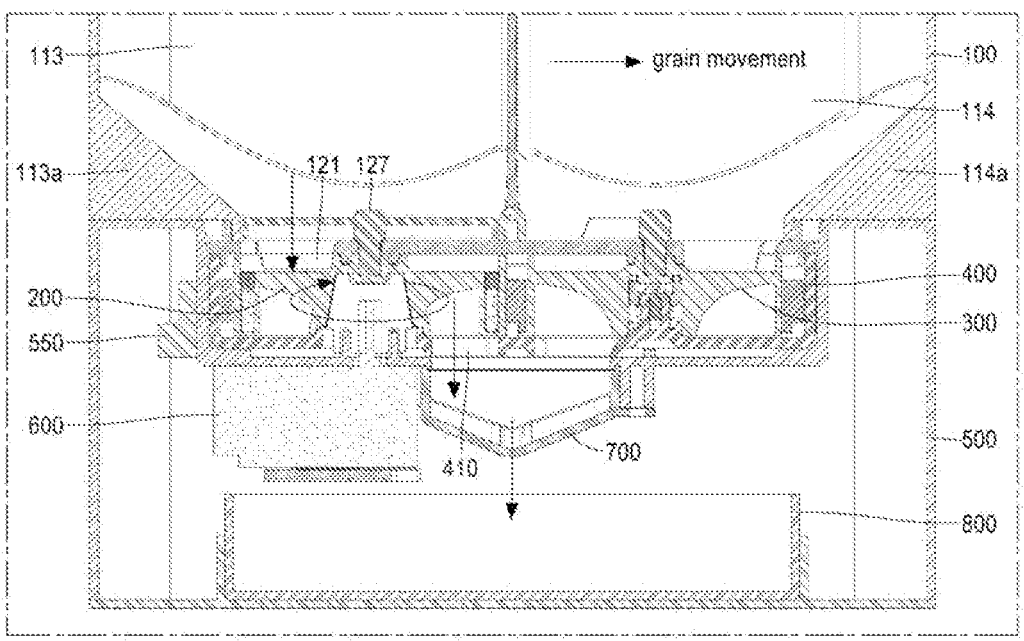
FIG. 17 is a view illustrating a discharge path of grains when a motor of an automatic dispenser for mixed measurement of grains according to an embodiment of the present disclosure rotates reversely.

FIG. 16 is a cross-sectional view illustrating a discharge path of grains when a motor of an automatic dispenser for mixed measurement of grains according to an embodiment of the present disclosure rotates forwardly, and FIG. 17 is a view illustrating a discharge path of grains when a motor of an automatic dispenser for mixed measurement of grains according to an embodiment of the present disclosure rotates reversely.

When the motor 600 rotates forwardly, grains stored in the storage bin 100 are introduced into the main measurer 200 and the auxiliary measurer 300 through the holes 121 and 122, rotate to reach the main discharge port 410 and the auxiliary discharge port 420 of the measurer housing 400, and then fall to the grain receiver 800 through the discharge tube 700.

Meanwhile, when the motor 600 is rotated reversely, the grains stored in the storage bin 100 are introduced into the main measurer 200 through the hole 121, rotate to reach the position of the main discharge port 410 of the measurer housing 400, and then fall to the grain receive 800 through the discharge tube 700. That is, the grains are discharged only through the main measurer 200.

Here, the storage compartments 113 and 114 of the storage bin 100 may respectively have inclined surfaces 113a and 114a inclined toward the holes 121 and 122 so that grains may easily move to the plurality of holes 121 and 122 provided on the bottom surface. When the inclined surfaces 113a and 114a are provided, grains in the storage compartments 113 and 114 are discharged through the holes 121 and 122 and then slide down along the inclined surfaces 113a and 114a by their own weight, thereby preventing grains from remaining on the edge, without being discharged to the storage compartments 113 and 114.

Figure 18:
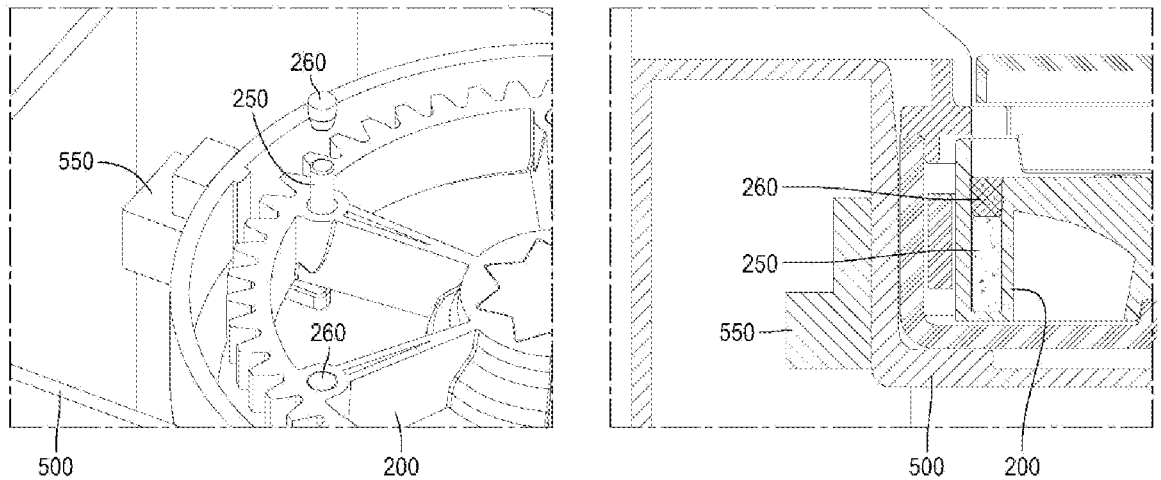
FIG. 18 is a view illustrating a magnet and a magnet sensor of an automatic dispenser for mixed measurement of grains according to an embodiment of the present disclosure.

FIG. 18 is a view illustrating a magnet and a magnet sensor of an automatic dispenser for mixed measurement of grains according to an embodiment of the present disclosure.

As described above, one or more magnets 250 are installed in the main measurer 200 and a magnet sensor 550 is installed in the base 500. When the main measurer 200 rotates and the magnet 250 approaches, the magnet sensor 550 detects the magnet 250. The controller 530 verifies a rotation amount of the main measurer 200 by calculating the number of times the magnet 250 is detected by the magnet sensor 550. The motor continues to rotate to weight and discharge grains until a set rotation amount is satisfied. If the measurers 200 and 300 are constrained and not rotated due to jamming of grains, this may be detected. For example, when a rotation signal is applied to the motor 600 but rotation of the magnet 250 of the main measurer 200 is not detected, the controller may determine this as a restraint state of the measurers 200 and 300. Here, as the number of magnets 250 inserted into the main measurer 200 increases, precision of detection of a rotation amount increases. Therefore, precision of the measurement of the discharged grains may increase.

Hereinafter, a method of operating an automatic dispenser for mixed measurement of grains according to the present disclosure will be briefly described.

Referring to FIGS. 1 to 18, the user may input a grain discharge amount and a mixing ratio to the controller 530. In a state in which different grains are stored in the main storage compartment 113 and the auxiliary storage compartment 114 of the storage bin 100, the sensor 132 attached to the lid 130 of the storage bin 100 measures a height of a top surface of the grains stored in the storage bin 100 to check the amount of grains. If the remaining amount of grains is greater than an input amount, a next process is performed. When the remaining amount of grains is sufficient, the motor 600 rotates forwardly so that the main measurer 200 and the auxiliary measurer 300 rotate at the same time. Here, the magnet sensor 550 detects the magnet 250 of the main measurer 200 and verifies a discharge amount, while checking a rotation amount by a set value. After the amount of grains stored in the auxiliary storage compartment 114 is mixed as much as desired, the motor 600 rotates reversely to operate only the main measurer 200, and thereafter, only the grains stored in the main storage compartment 113 are discharged. Even when grains are discharged from the main storage compartment 113, the magnet sensor 550 detects the magnet 250 of the main measurer 200 and verifies a discharge amount, while checking a rotation amount by the set value.

When the number of teeth of the teeth 222 and 324 of the main measurer 200 and the auxiliary measurer 300 and an internal volume of the measurement compartments 202 and 311 are equal, the two measurers 200 and 300 discharge the same amount of grains when the motor 600 rotates forwardly, and thus, a discharge ratio of the grains is 1:1. Accordingly, when the motor 600 rotates reversely, only the main measurer 200 rotates and the inner part 310 of the auxiliary measurer 300 does not rotate, so that the discharge ratio of grains is 1:0.

Therefore, when the user sets a mixing ratio of the grains of the main measurer 200 and the auxiliary measurer 300 to (M:S) (here, M≥S), a ratio of forward rotation: reverse rotation may be set to S:(M−S). For example, when the user inputs a grain mixing ratio of 5:2, the controller 530 may set the ratio of forward rotation: reverse rotation to 2:3.

Also, even in the case of using single grains, instead of mixed grains, grains may be measured using both the main measurer 200 and the auxiliary measurer 300 so that the measurement may be performed more quickly and accurately. For example, assuming that a discharge ratio of the main measurer 200 and the auxiliary measurer 300 is 1:1, if only forward rotation is possible, grains may be discharged only in even multiple with respect to a measurement unit amount of the main measurer 200, while the main measurer 200 and the auxiliary measurer 300 simultaneously rotate. However, when reverse rotation is possible, an amount of grains corresponding to an odd multiple of the unit amount of the main measurer 200 may be discharged. For example, in the case of discharging 5 times the unit amount of the main measurer 200, the forward rotation may be performed twice and the reverse rotation may be performed once. Of course, even when the discharge ratio of the main measurer 200 and the auxiliary measurer 300 is not 1:1, it may be used to measure single grains in the same manner.

Figure 19:
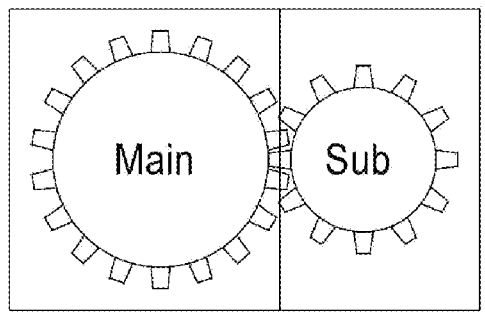
FIG. 19 is a view schematically illustrating a first arrangement example of a measurer of an automatic dispenser for mixed measurement of grains according to the present disclosure.
Figure 19:
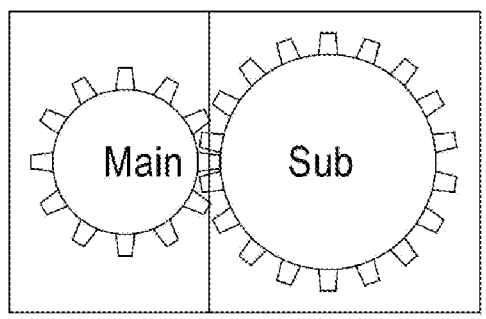

FIG. 19 is a view schematically illustrating a first arrangement example of a meter of an automatic dispenser for mixed measurement of grains according to the present disclosure.

As a measurer, one main measurer and one auxiliary measurer may be arranged. In the embodiment described above, the main measurer and the auxiliary measurer have the same size, but the main measurer may be larger or the auxiliary measurer may be larger. In this case, a mixing ratio of grains measured and discharged from each measurer varies according to a gear tooth ratio of the main measurer and the auxiliary measurer and a ratio of the internal volume of the measurement compartment.

If the size of the main measurer is larger and the internal volume ratio is 2:1 and the gear tooth ratio is 3:2, a discharge ratio of grains in the case of forward rotation is 4:3 and a discharge ratio of grains in the case of reverse rotation is 4:0. Therefore, when the grain mixing ratio is set to M:S, the ratio of forward rotation: reverse rotation is 4S:(3M−4S) (here, 3M≤4S).

If the size of the auxiliary measurer is larger and the ratio of the internal volume is 1:2 and the gear tooth ratio is 2:3, the discharge ratio of grains in the case of forward rotation is 3:4 and the discharge ratio of grains in the case of reverse rotation is 3:0. In this case, when the mixing ratio of grains is set to M:S, the ratio of forward rotation: reverse rotation is 3S:(4M−3S) (here, 4M≥3S).

Figure 20:
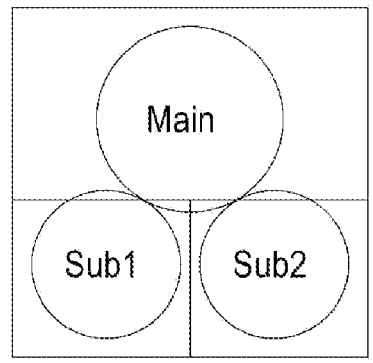
FIG. 20 is a view schematically illustrating a second arrangement example of a measurer of an automatic dispenser for mixed measurement of grains according to the present disclosure.
Figure 21:
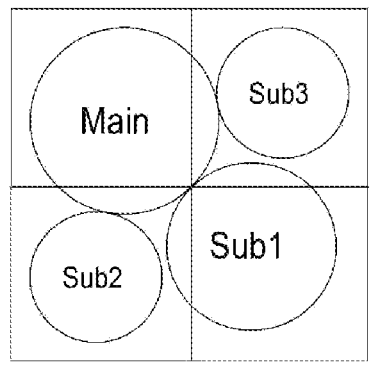
FIG. 21 is a view schematically illustrating a third arrangement example of a measurer of an automatic dispenser for mixed measurement of grains according to the present disclosure.
Figure 22:
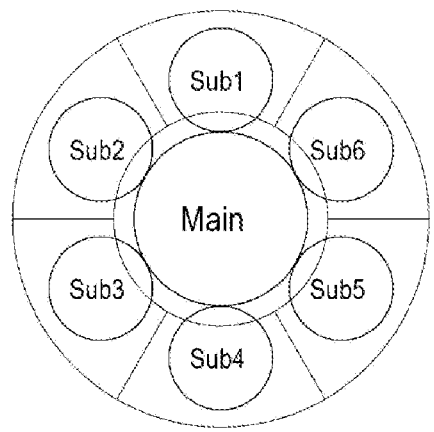
FIG. 22 is a view schematically illustrating a fourth arrangement example of a measurer of an automatic dispenser for mixed measurement of grains according to the present disclosure.

FIG. 20 is a view schematically illustrating a second arrangement example of a meter of an automatic dispenser for mixed measurement of grains according to the present disclosure, FIG. 21 is a view schematically illustrating a third arrangement example of a meter of an automatic dispenser for mixed measurement of grains according to the present disclosure, and FIG. 22 is a view schematically illustrating a fourth arrangement example of a meter of an automatic dispenser for mixed measurement of grains according to the present disclosure.

The automatic dispenser for mixed measurement of grains according to the present disclosure may have one main measurer and two or more auxiliary measurers arranged around the main measurer.

Figure 23:
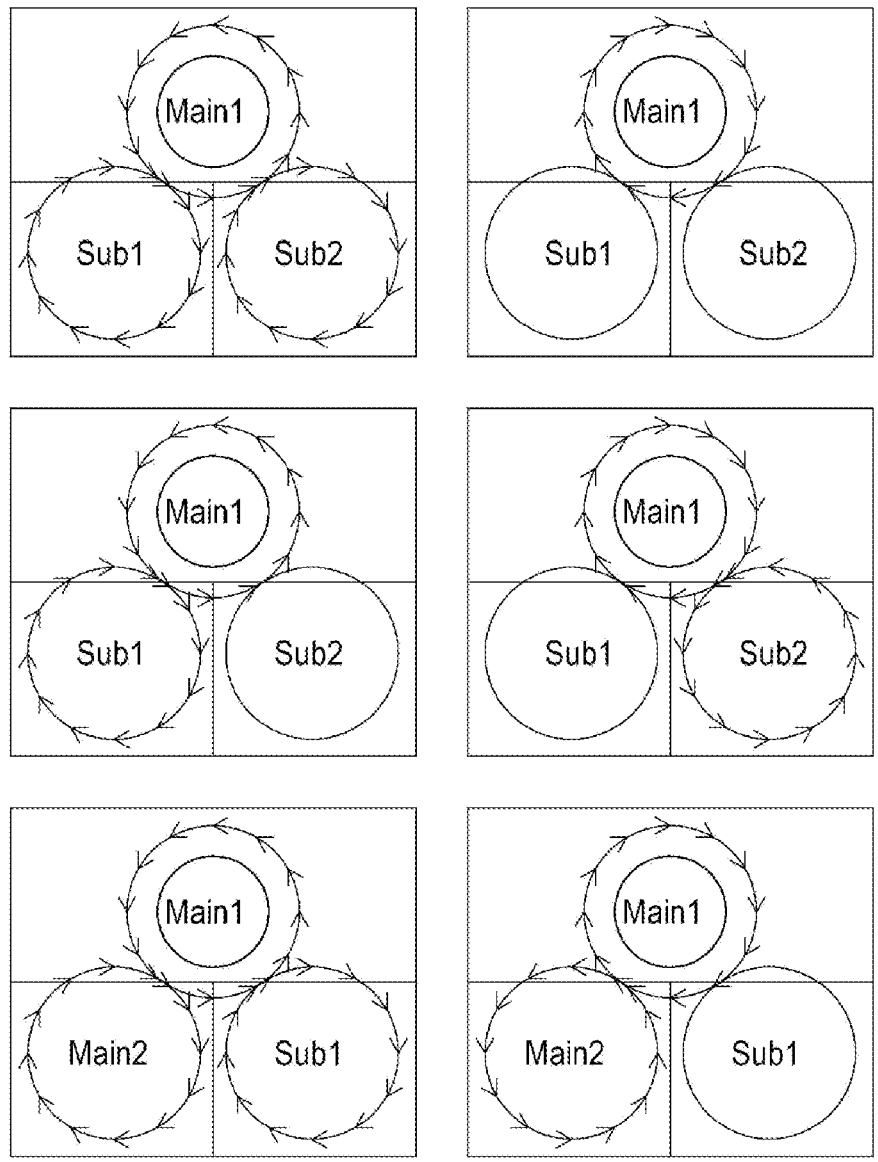
FIG. 23 is a view schematically illustrating various measurement methods using the second arrangement example of a measurer of an automatic dispenser for mixed measurement of grains according to the present disclosure.

FIG. 23 is a view schematically illustrating various metering methods using the second arrangement example of a meter of an automatic dispenser for mixed measurement of grains according to the present disclosure.

The measurers may be arranged so that both auxiliary measurers rotate together when the main measurer rotates forwardly, and both auxiliary measurers do not rotate when the main measurer rotates reversely. When the mixing ratio of grains is set to M:S1: S2 (here, S1=S2, M≥S1), the ratio of forward rotation: reverse rotation is S1: (M−S1)·X In addition, the first auxiliary measurer rotates together when the main measurer rotates forwardly, and the second auxiliary measurer rotates together when the main measurer rotates reversely, thereby varying the types of mixed grains mixed with a main grain. When the mixing ratio of grains is set to M:S1: S2 (here, S1+S2=M), the ratio of forward rotation: reverse rotation is (M−S2):(M−S1).

In addition, when the main measurer rotates forwardly, the first and second auxiliary measurers may rotate together, and when the main measurer rotates reversely, the first auxiliary measurer may rotate together and the second auxiliary measurer may not rotate. Here, when the mixing ratio of grains is set to M:S1: S2 (here, M=S1, M≥S2), the ratio of forward rotation: reverse rotation is S2: (M−S2).

By using the third and fourth arrangement examples above, grains may be mixedly measured at various mixing ratios by adjusting the discharge ratios of the main measurer and the auxiliary measurers.

As described above, the present disclosure is not limited to the specific preferred embodiments described above, and anyone with ordinary skill in the art to which the invention pertains may use various methods without departing from the gist of the present disclosure as claimed in the claims. It goes without saying that modifications are possible, and such modifications are intended to be within the scope of the claims.

What is claimed is:

1. An automatic dispenser for mixed measurement of grain, the automatic dispenser comprising:
    a storage bin having a plurality of holes on a bottom surface and storing grains a main measurer having a plurality of main measurement compartments partitioned and rotatably installed at a position overlapping any one of the plurality of holes provided on the bottom surface of the storage bin;
    an auxiliary measurer having a plurality of auxiliary measurement compartments partitioned and installed at a position overlapping the rest of the plurality of holes provided on the bottom surface of the storage bin, the plurality of measurement compartments being installed to be rotatable only in one direction with respect to the main measurer;
    a measurer housing installed below the main measurer and the auxiliary measurer and having a discharge port discharging the grains introduced into the main measurer and the auxiliary measurer from the storage bin; and
    a motor rotating the main measurer in both directions,
    wherein only the main measurer is used or both the main measurer and the auxiliary measurer are used depending on a rotation direction of the motor.

2. The automatic dispenser of claim 1, wherein the storage bin is divided into a plurality of storage compartments by a partition.

3. The automatic dispenser of claim 2, wherein at least one hole is formed in each storage compartment, and at least one of the main measurer and the auxiliary measurer is installed at a lower portion of each hole.

4. The automatic dispenser of claim 1, wherein the main measurer includes a central shaft, an outer ring having a cylindrical shape, and having gear teeth formed on an outer circumferential surface, and a partition connecting the outer ring to the central shaft, and the auxiliary measurer includes an inner part having a measurement compartment and an outer part allowed to rotate in only one direction with respect to the inner part, and an outer circumferential surface of the outer part has teeth engage with a gear teeth of the main measurer.

5. The automatic dispenser of claim 4, wherein a ratchet protrusion is formed on an outer circumferential surface of the inner part, a ratchet gear is formed at a lower end of the outer part, so that the outer part is allowed to rotate only in one direction with respect to the inner part.

6. The automatic dispenser of claim 1, further comprising a discharge tube installed below the measurer housing and guiding movement of the grains discharged from the discharge port.

7. The automatic dispenser of claim 6, wherein the discharge tube is in the form of a hopper having an inclined surface to be low in the middle so as to easily discharge the grains, and has a discharge port provided in a center of the hopper.

8. The automatic dispenser of claim 6, further comprising a base coupled to a lower portion of the measurer housing and providing an installation space for the motor and the discharge tube.

9. The automatic dispenser of claim 8, further comprising a grain receiver detachably coupled to the base and receiving the grains discharged through the discharge tube.

10. The automatic dispenser of claim 6, further comprising a transfer pipe transferring the grains discharged through the discharge tube to a cooking machine.

11. The automatic dispenser of claim 1, further comprising a unit measuring an amount of rotation of the main measurer and whether the main measurer rotates.

12. The automatic dispenser of claim 11, wherein the main measurer includes one or more magnets, and further includes a magnet sensor sensing the magnet of the main measurer.

13. The automatic dispenser of claim 1, wherein the storage bin includes a sweeper installed on at least one side of the plurality of holes and protruding downwardly to sweep the grains discharged to the main measurer and the auxiliary measurer into the main measurement compartments and the auxiliary measurement compartments.

14. The automatic dispenser of claim 1, wherein the storage bin includes an upper lid opening and closing the storage bin and a sensor coupled to the lid to measure a remaining amount of the grains.

15. The automatic dispenser of claim 2, wherein the storage bin includes a plurality of fixing ribs, and the partition is inserted between the plurality of fixing ribs to be detachably installed.

16. The automatic dispenser of claim 15, wherein the plurality of fixing ribs includes an L-shaped rib, and the partition is inserted into a gap between the L-shaped rib and the storage bin to be stored in the storage bin.

17. The automatic dispenser of claim 1, wherein a blade-type rotor connected to a central shaft of the main measurer and the auxiliary measurer, rotating together, and extending along the bottom of the storage bin.

18. The automatic dispenser of claim 17, wherein the blade-type rotor includes a rotor shaft connected to the central shaft of the main measurer and a plurality of blades extending to both sides of the rotor shaft.

19. The automatic dispenser of claim 18, wherein the blade has a shape having a cross-sectional area narrower toward an upper end.

20. The automatic dispenser of claim 1, wherein
a ratchet gear is formed on a lower surface of a central shaft of an inner part of the auxiliary measurer, and
the measurer housing includes a reverse rotation preventing portion supported to be movable up and down by an elastic member and engaged with the ratchet gear of the central shaft of the inner part to allow the inner part to rotate only in one direction.

21. The automatic dispenser of claim 20, wherein
the measurer housing includes a coupling shaft protruding toward the auxiliary measurer, and
the reverse rotation preventing portion includes an elastic member fitted to the coupling shaft and having a lower end supported by the measurer housing, a ratchet portion supported to be movable up and down by an upper end of the elastic member and having a coupling hole coupled to the coupling shaft, and a stopper limiting a position of the ratchet portion to prevent the ratchet portion from being released upwardly, and fixed to the coupling shaft.

22. The automatic dispenser of claim 1, wherein a measurement unit amount of the auxiliary measurer with respect to a measurement unit amount of the main measurer is equal to each other, the measurement unit amount of the auxiliary measurer is larger, or the measurement unit amount of the main measurer is larger.

23. The automatic dispenser of claim 1, wherein two or more auxiliary measurers are placed around one main measurer.

24. The automatic dispenser of claim 1, wherein the storage bin includes an inclined surface inclined toward the plurality of hole to allow grains provided on the bottom surface to be easily moved.

25. The automatic dispenser of claim 1, further comprising:
a main gear coupled to a shaft of the motor and transmitting a rotational force to the main measurer,
wherein the main measurer includes a lower groove coupled to the main gear on the central shaft to receive a rotational force from the main gear.

26. The automatic dispenser of claim 1, further comprising:
a controller inputting a discharge amount of grains and a mixing ratio,
wherein the controller controls rotation of the motor by calculating the number of forward and reverse rotations of the motor.

* * * * *